US009458950B2

(12) United States Patent
Walters et al.

(10) Patent No.: US 9,458,950 B2
(45) Date of Patent: Oct. 4, 2016

(54) LINING OF PIPELINES TO OFFSHORE INSTALLATIONS

(71) Applicant: Petroliam Nasional Berhad (PETRONAS), Kuala Lumpur (MY)

(72) Inventors: Robert Walters, Dubai (AE); Muhammad Ashri Mustapha, Kuala Lumpur (MY)

(73) Assignee: Petroliam Nasional Berhad (PETRONAS), Kuala Lumpur (MY)

( * ) Notice: Subject to any disclaimer, the term of this patent is extended or adjusted under 35 U.S.C. 154(b) by 0 days.

(21) Appl. No.: 14/409,287

(22) PCT Filed: Jun. 25, 2013

(86) PCT No.: PCT/MY2013/000117
§ 371 (c)(1),
(2) Date: Dec. 18, 2014

(87) PCT Pub. No.: WO2014/003539
PCT Pub. Date: Jan. 3, 2014

(65) Prior Publication Data
US 2015/0192223 A1    Jul. 9, 2015

(30) Foreign Application Priority Data

Jun. 29, 2012    (MY) .......................... PI2012002988

(51) Int. Cl.
| F16L 1/26 | (2006.01) |
| B29C 63/34 | (2006.01) |
| F16L 58/10 | (2006.01) |
| F16L 55/165 | (2006.01) |
| F16L 58/02 | (2006.01) |
| F16L 58/04 | (2006.01) |
| F16L 58/16 | (2006.01) |

(52) U.S. Cl.
CPC .................. *F16L 1/26* (2013.01); *B29C 63/34* (2013.01); *F16L 55/1654* (2013.01); *F16L 55/1656* (2013.01); *F16L 58/02* (2013.01); *F16L 58/04* (2013.01); *F16L 58/1009* (2013.01); *F16L 58/16* (2013.01); *B29C 63/343* (2013.01)

(58) Field of Classification Search
CPC combination set(s) only.
See application file for complete search history.

(56) References Cited

U.S. PATENT DOCUMENTS

| 5,213,727 A * | 5/1993 | Gargiulo | ............... B29B 13/024 |
| | | | 138/97 |
| 5,273,414 A | 12/1993 | Gargiulo | |
| 5,501,248 A * | 3/1996 | Kiest, Jr. | .................. D04B 1/02 |
| | | | 138/123 |

(Continued)

FOREIGN PATENT DOCUMENTS

EP    2273171    1/2011

OTHER PUBLICATIONS

WO patent application No. PCT/MY2013/000117, International Search Report mailed Aug. 16, 2013.

*Primary Examiner* — Benjamin Fiorello
*Assistant Examiner* — Kyle Armstrong
(74) *Attorney, Agent, or Firm* — Weaver Austin Villeneuve & Sampson LLP

(57) ABSTRACT

A system (2) for relining an undersea pipeline (5), said pipeline (5) having and inlet (13) and outlet (11) beneath sea level (8), comprising a coiling drum (3) positioned above sea level and having a length of liner (1) reeled thereon; said coiling drum (3) arranged to deliver said liner (1) to the inlet (13); an actuator engaged with a leading end of said liner and arranged to apply a tensile force (6) to said liner (1) so as to draw said liner through the pipeline; wherein the liner is of a composite construction having a fiber core.

19 Claims, 7 Drawing Sheets

(56) References Cited

U.S. PATENT DOCUMENTS

| | | | |
|---|---|---|---|
| 5,671,778 A * | 9/1997 | Sakuragi | B29C 63/0013 138/125 |
| 6,170,531 B1 * | 1/2001 | Jung | E03F 3/06 138/97 |
| 6,978,804 B2 | 12/2005 | Quigley et al. | |
| 2008/0110616 A1 * | 5/2008 | Nobileau | E21B 43/103 166/207 |
| 2010/0282351 A1 * | 11/2010 | Kamiyama | F16L 55/1656 138/98 |
| 2015/0053295 A1 * | 2/2015 | Elzink | F16L 55/1654 138/97 |

* cited by examiner

LINING OF PIPELINES TO OFFSHORE INSTALLATIONS

FIELD OF THE INVENTION

This invention relates to the lining of pipelines such as those that run from onshore to offshore installations or between offshore installations, including oil or gas production well heads to offshore gathering platforms or offshore gathering platforms to onshore storage or process facilities

BACKGROUND

The utilization of protective barriers for the prevention of corrosion to the metallic elements of a pipeline wall structure is a common practise.

A coating is normally selected for its ability to withstand the operating temperature of the pipeline and deterioration due to the surrounding conditions such as contact with soil or ground water in which it is to be placed so as to provide a protective layer between the pipe and the surrounding media.

Where the pipeline is positioned in a buried or sub-sea environment, it is also normal for the coating barrier to be supplemented with a cathodic protection system of either an impressed or sacrificial nature. This will act to provide a further level of corrosion protection to the pipeline in the event of minor coating defects. Further, it usually has the additional capability of being able to be enhanced, or having its output increased so as to provide a greater level of protection as the external coating starts to break down or suffer from mechanical damage in the normal course of its life cycle. This provides the means to continue to cathodically protect the external surface of the pipeline from corrosion related damage, even after the effectiveness of the coating barrier diminishes.

It may therefore be stated that in general, the protection of the external surface of a metallic pipeline from corrosion is a relatively straightforward process in terms of its implementation and effective maintenance.

The design and implementation of a corrosion barrier to the internal surface of a metallic pipeline is a much more complex matter however.

It is not usually possible to implement an effective supplementary cathodic protection system to provide protection to internal surfaces of a metallic pipeline. In cases therefore where the media being conducted through the bore of a pipeline is of a particularly high temperature and/or aggressive nature due to its chemical, physical or biological constituents, which will result in a high level of risk from either electrolytic or microbiological corrosion, or erosion, then the utilization of a coating system as described above becomes a non-viable option because of the absolute necessity for a reliable, continuous coating across the field joint region.

The historical tendency within the pipeline industry has therefore been to omit an internal corrosion resistant barrier altogether, when low to medium corrosion rates are anticipated. In this case the metallic pipe wall may be thickened substantially to allow for a calculated corrosion rate to occur over the design life of the pipe structure. An alternative to this, where high corrosion or erosion rates are expected and where practical, it is possible to first complete the pipeline construction and then install a tubular barrier liner of a polymeric or plastic nature in very long lengths, thus overcoming the need for internal field joint coatings.

There is a number of different polymeric and plastic tubular liner types commonly used as internal corrosion barriers and a number of different installation methodologies employed, having been adapted from onshore systems.

In the most simple case, commonly known as loose fit lining, a plastic tube, often manufactured by the extrusion of a polyethylene solid-walled pipe (or another form of plastic), that has an external diameter somewhat less than the internal bore of the host metallic pipeline (typically by 5%), is towed inside the steel pipe bore, using a cable and winch. If operated at a low internal pressure which produces hoop stress in the liner wall less than the yield strength of the polymer from which the pipe was extruded, then the liner will effectively operate as an independent pipe within a pipe. It ill then carry the media independent of the host metallic pipeline, with an annular space existing between the liner and the inner surface of the host pipe wall. Where such a liner is being installed as a means of rehabilitation, the pipeline owner will have to accept the reduction in cross sectional area of the pipeline bore result from the liner insertion, and the production and economic loss.

In many cases however the operating pressure of the pipeline will be greater than the capacity of the plastic liner.

Alternatively, the liner may inflate, until it comes into contact with and is restrained by, the internal surface of the metallic pipe wall. Decades ago this was perceived to be a cost effective manner of effectively producing a tight fit liner against the inner wall of the host pipeline. In later years however, the downside elements of this process have become more widely appreciated. These downside elements include a tendency of the liner to revert back toward its original diameter due to the molecular memory inherent in the polymer from which the liner was extruded, a process known as reversion. This reversion process can happen particularly rapidly where the polymer used for the liner manufacture is permeable to certain of either the gaseous or liquid elements in the media being conducted. The liner reversion process thus gives rise to the re-creation of the annular space, in which the accumulated gaseous and/or liquid elements will accumulate at a pressure that is equal to that of the media in the internal liner bore. This is undesirable inasmuch as 1) the elements accumulated in the annulus may well be in and of themselves corrosive to the metallic pipe wall, 2) any sudden reduction in the operating pressure of the pipeline may cause a large differential between the pressure in the liner bore and annulus, causing a flattening, collapse and even catastrophic failure of the liner.

Another common, more modern method of installing a plastic liner into a metallic host pipeline as a means of corrosion protection is that of tight fit lining. There are various mechanisms that have been created that achieve this and all are aimed at overcoming the deficiencies of the loose fit lining methods which are described above. One method is by the use of a conical reduction die, through which a liner having an external diameter slightly greater than that of the host metallic pipeline is drawn under tension, so that it becomes smaller in diameter than the host pipe bore, into which it is subsequently installed. When the tension on the liner is removed, the liner then quickly reverts back toward its original diameter due to the molecular memory inherent in the polymer from which it is extruded. This outward reversion of diameter or swelling of the liner causes the liner to come into intimate contact with the host pipe wall in such a manner that no annular space exists between the outer surface of the liner tube and the inner surface of the pipe wall. This method is known by various terms such as "Die Drawing", "Compression Fit Lining", or "Swagelining". In the most common applications involving a liner diameter reduction using a die mechanism, a liner comprising an extruded cross section of solid wall polyethylene pipe is used.

Another means of producing a similar tight fit liner result also involves starting with an oversized liner but utilizes a series of rollers or spherical bearings to press inwardly and circumferentially onto the outside surface of the liner in a compressive manner so as to effect the desired liner diameter reduction. This process is commonly known as roller box reduction. With certain (not all) roller box configurations however, the stresses imposed upon the liner during the diameter reduction process are so significant that they exceed the memory retention capabilities of the liner polymer and it is therefore necessary to use a post insertion inflation pressure to ensure a tight fitting liner is produced by the process.

In all of the above examples, the liner section is manufactured of solid, unreinforced plastic which must therefore carry the entire burden of the installation forces as are required to position the liner within the host metallic pipeline. There is a limitation as to how thin the liner wall thickness can be in relation to the liner diameter by virtue of the fact that it is necessary to maintain a high enough liner yield strength so as to enable installation over a long distance, yield strength being a multiple of the polymer yield strength and cross sectional area of the liner wall. For this reason, it is usual for the thickness of the plastic liner produced to considerably exceed that which would be necessary if considered purely from the standpoint of its capabilities to act as an impermeable protective corrosion resistant barrier.

The principal limiting factor in respect of the maximum distance over which any polymeric or plastic type tight-fit liner can be installed within the bore of a host metallic pipeline is therefore always the relationship between the tensile yield strength of the liner and the sum of the pulling force required to overcome the diameter reduction process plus the weight and friction of the liner during the installation process. Liner yield strength is also a factor that is very sensitive to temperature variations as when a plastic polymer becomes warm, its yield strength decreases dramatically, thus in warmer climates, the installation distances of conventional tight fit liners may be reduced considerably. In all cases, a safety factor must also be considered, which will further reduce the distance over which it is permissible to install the liner. Conversely however, at lower temperatures, a plastic liner will tend to become more rigid and stiff making it more difficult to install around even large diameter bends in the host metallic pipeline.

In deep sea applications, where the surrounding temperature is 5° C. or less, the rigidity of the liner is of greater importance. The flexural stresses in the extreme fibres of the liner are a function of wall thickness and so for thick walled liners, the capacity of the liner to resist applied flexural deformation decreases. Such flexural loads include deformation under external hydrostatic pressure, or bending as a result of the liner moving around a bend during installation. A plastic liner that has been manufactured to have a wall thickness adequate enough to provide the capability of being pulled inside a metallic host pipe over a long distance without tensile failure will, by nature, have a limited capability to bend around a corner, or short radius bend due to the applied flexural loads, such as is commonly present on certain types of pipelines, especially those which are positioned sub-sea. As even onshore pipelines are rarely fabricated in a straight line, this ability of the liner to go around bends may be the most significant limitation with respect to how and if such a liner can be installed within a metallic host pipe.

Whilst cross-sectional area, and so wall thickness, increases the liner's tensile capacity for installing into long straight sections, for installing around bends, wall thickness becomes a significant limiting factor due to the reduced flexural capacity. In almost all cases where liners manufactured from existing technologies are used however, the total length of the complete host pipeline structure will exceed the length over which it is possible to install the liner and it is therefore necessary to divide the pipeline into two or more sections, with intermediate terminations and connectors, between which the liners can consequently be successfully installed. In the case of an onshore pipeline this is usually convenient because the location of the terminations points and connectors can be planned so as to be accessible. In the case of a sub-sea pipeline however this fact alone will generally mean that the installation of such a liner is not viable.

Another consideration is that although it may be possible to transport the plastic liner from the point of manufacture and deliver it to the metallic pipeline insertion point in rolls of long lengths in the case of smaller diameters, larger diameter plastic liner pipes cannot be coiled because the diameter of coil that would be necessary so as to avoid the buckling and damaging of the liner would be unmanageable. Normally therefore, larger diameter liner pipes are transported from the factory to the vicinity of the host metallic pipeline in lengths of between twelve and fifteen meters, in a cylindrical, straight form and are welded, or fused together to form a continuous string of liner material of the appropriate length. This welding, or fusion process requires a considerable amount of space to conduct and also a considerable degree of time, equipment, personnel and therefore expense to complete. While the difficulties associated with this welding process can normally be overcome relatively easily in an onshore environment, the transportation, storage, handling and welding together of plastic liner sections in an offshore environment will normally represent such a high degree of difficulty and require such a large amount of space as to render such a project unviable using a conventional plastic liner.

In summary, the characteristics of plastic liners that are currently available for the purpose of providing a corrosion resistant barrier to the internal surface of a metallic pipeline have the following characteristics and issues:

the wall thickness is usually determined by the requirement for tensile strength more than other performance abilities;

there is a limit to the straight line distance over which these liners can be installed;

the distance over which installation is possible may be dramatically reduced when there are bends in the pipeline;

it is not normally viable to install a liner from one end of a pipeline to the other in a single length without the need for intermediate connections.

liners cannot be installed around short radius bends such as are commonly found in sub-sea pipelines, due to the limitations in flexural strength and a tendency to buckle and kink.

The above factors indicate that in almost all circumstances, it is impossible to use currently available plastic liners and lining techniques for the internal corrosion protection of sub-sea pipelines.

SUMMARY OF INVENTION

According to a first aspect, the invention provides a system for relining an undersea pipeline, said pipeline having and inlet and outlet beneath sea level, comprising a coiling drum positioned above sea level and having a length of liner reeled thereon; said coiling drum arranged to deliver said liner to the inlet; an actuator engaged with a leading end of said liner and arranged to apply a tensile force to said liner so as to draw said liner through the pipeline; wherein the liner is of a composite construction having a fibre core.

According to a second aspect, the invention provides a method for relining an undersea pipeline, the method comprising the steps of: positioning a coiling drum above sea level, having a length of liner reeled thereon; delivering said liner to a subsea inlet of the pipeline; engaging an actuator with a leading end of said liner; applying a tensile force to said liner so as to draw said liner through the pipeline.

According to the present invention, by providing access for the liner from the coiling drum to the inlet, the system according to the present inventions allows the relining of pipes at great depths. Whereas relining pipes from a terrestrial base allows sufficient space and control over the system to ensure success, such system cannot control the relining of pipes at great depths. For instance, having the liner located on the coiling drum ensures a very small footprint, which allows the relining process to commence from a floating platform. The axial tensile strength of the line is provided by the fibre reinforcement of the fibre core. This means the inner layer can be designed solely for its chemical properties. As such, it can be much thinner and therefore avoiding the issues of yielding the extreme fibres. Further, it will therefore be more flexible and able to avoid the issues of buckling or kinking that are inherent with thicker walled liners. This means the liner can navigate bends more easily and the high tensile strength of the warp fibre core reinforcements means long lengths can be pulled through a sub-sea pipeline.

A layer of plastic is preferably also on the outer surface of the fibre core, for example a Thermoplastic Polyurethane ("TPU"), Polyethylene or cross-linked Polyethylene resin again with a thickness of 1 mm to 5 mm. The resin selected for the external barrier will normally be one that can perform at the pipeline operating temperature and that has a lower degree of permeation resistance than that of the inner plastic lining. In one embodiment, the diameter of liner may be in the range 10 cm to 50 cm.

The internal plastic liner, which may be PVDF resin or another form of high performance plastic, has superb hydrocarbon resistance, thermal resistance, high flexibility and low permeability. However, other polymers may be used, which in particular have the required thermal resistance and chemical resistance. Other examples of semi-crystalline fluorinated polymers are Polytetrafluroethylene (PTFE), Perfluoroalkoxy (PFA), and Poly(Ethylene Chlorotrifluoroethylene) (ECTFE). Examples of suitable non-fluorinated polymers are Polyetheretherketone (PEEK), Polyamide-Imide (PAI), Polysulfone (PSF), Polyethersulfone (PES) and Polyphenylsulfone (PPSU).

In some cases it may be desirable to combine two or more material types so as to produce a plastic liner that has a combination of desired properties, such as high flexibility, temperature resistance and permeation resistance.

The liner may be provided rolled on a drum with the liner flattened over the drum. This enables easy transportation of long lengths of liner, for example a length of 1 km to 10 km.

A towing head can be used for pulling the liner into the pipeline together with the means for attaching the towing head directly to the fibre core of the liner. This means the pulling force is applied to the fibre core, which can withstand the tensile forces.

BRIEF DESCRIPTION OF DRAWINGS

It will be convenient to further describe the present invention with respect to the accompanying drawings that illustrate possible arrangements of the invention. Other arrangements of the invention are possible and consequently, the particularity of the accompanying drawings is not to be understood as superseding the generality of the preceding description of the invention.

DETAILED DESCRIPTION

Figure 1:
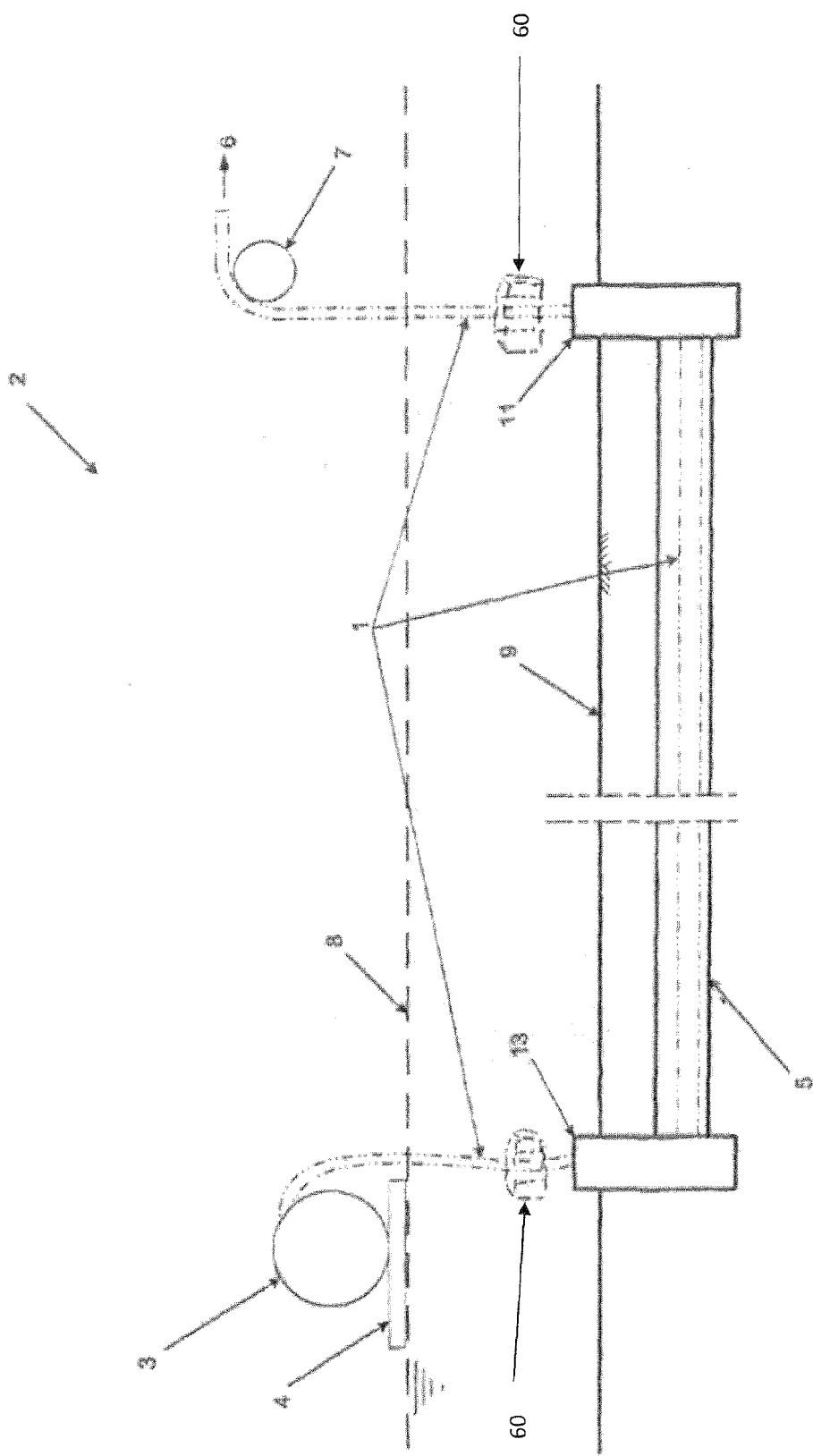
FIG. 1 is a schematic view of a subsea pipeline receiving system according to the present invention.

As shown in FIG. 1, the invention provides pipeline relining system 2, having a liner 1 for a sub-sea pipeline 5. In this case, the pipeline is located beneath the sea floor 9. However, the system is equally applicable to pipelines placed and secured on the sea floor, or partially buried.

The system 2 includes a coiling drum 3, which in this case is located on a floating platform 4, so as to maintain the supply of liner 1 on the coiling drum 3 above sea level, whilst delivering liner 1 to a sub-sea inlet 13. The floating platform 4 may be a barge, ship, oil and gas platform or a purpose built vessel for supporting and facilitating the installation of the liner.

It will be appreciated that, by providing a platform for the support of the coiling drum 3, it is possible that the pipeline may be located anywhere, with the example of an oil and gas platform of particular interest, as such platforms may be located up to hundreds of kilometers from shore. The reliance on a terrestrial based system is therefore avoided.

The liner 1 is engaged with an actuator 7 so as to provide a tensile force 6 and so draw the liner 1 through the pipeline 5 and finish at an outlet, which may also be on a floating platform (not shown).

To facilitate the installation process, the liner may be guide by a direction assembly 60 so as to guide the liner from the coiling drum 3 into the inlet, and then out of the outlet. It will be appreciated that the engagement with the actuator may be through a towing head (not shown), with the installation ending on the liner reaching the outlet 11, and only a cable to which the towing head is engaged exiting the outlet 11.

The liner 1 is characterised by a fibre core; and a layer of plastic at least on the inner surface of the fibre core. In one embodiment the longitudinal and radial fibers may comprise the same material having similar tensile and elongation properties. Alternatively they may be of different materials having different tensile and elongation properties such that the liner may be able to more easily expand to a greater diameter when subject to internal pressurisation. The fibre core thus achieves the multiple aims of possibility of installation of long lengths as well as a tight fit in the pipeline being serviced.

The liner enables the tight-fit lining of submarine pipelines over very long distances, and in a viable manner including instances where the pipeline concerned incorporates one or more short radius bends. The liner materials used are selected to provide an effective corrosion resistant barrier to the internal surface of the pipeline even in an aggressive single, duel and multiphase hydrocarbon environment at temperatures up to 130 degrees centigrade and at high operating pressures. The liner can be used for both new and existing pipelines and provides a very considerable extension in life expectancy of the pipeline structure in either case.

The lining material and installation techniques of the invention are specifically aimed at providing the improvements necessary so as to enable the installation of a high performance corrosion resistant barrier to the internal surface of a sub-sea pipeline.

The system comprises a liner pipe which is manufactured in three stages. Each stage is sequential and continuous from the commencement to the completion of the manufacture of the desired quantity of liner.

The first stage is the production of a fabric core which can consist of one or more layers of very high strength fibres. These fibres may be Aramid, Carbon, Polyester, some other form of fibre or indeed a combination of two or more different fibres. The fabric core is created by mechanically weaving the fibre together so as to form a continuous circular tube of the desired diameter. In one embodiment, the fibre or fabric core may comprise fibre reinforcements comprising warp fibres 50 which run generally axially along the length of the liner, and weft fibres 55 which run circumferentially around the liner. The fibre core may for instance consist of between 1,000 and 2,000 fibre yarns, with each yarn having between 5 and 15 fibres and between 5,000 and 25,000 dtex. The fabric is woven primarily in the 0 degree and 90 degree directions so as to provide the highest degree of both axial and radial strength. The fibres used for the axial and radial weaving may be of a different type so as to, for instance, provide the maximum possible longitudinal tensile strength with a relatively large degree of capability for radial elasticity.

The inner fabric core can have an axial tensile strength at least 100 times as great as the tensile strength of plastic.

The second stage is the extrusion of a layer of plastic onto the inner surface of the fibre core. The plastic can be PVDF, thermoplastic polyurethane, polyethylene, cross linked polyethylene, polyamide, or another high performance plastic material as previously described, or a formulation comprising of a combination of two or more of these plastics designed to satisfy the working requirements of the pipeline into which it will be deployed as a corrosion barrier. The inner plastic liner is essential to provide the desired resistance to the fluid in the pipeline and act as corrosion barrier thereby preventing the pipeline fluid from causing damage or deterioration to the steel pipeline. The thickness of the inner plastic liner will be determined so as to be adequate to provide an impermeable barrier in respect of the fluid and gaseous elements being conveyed through the pipeline and yet will be formulated so as to retain a high degree of flexibility as is required to enable the liner to be folded.

Typically, the inner plastic liner will be of a 2 to 3 mm thickness in a small diameter pipeline application (such as 10 cm to 20 cm) and of a 3 mm to 5 mm thickness is larger diameters (25 cm or more).

The third stage is the extrusion of a plastic layer onto the outer surface of the fibre core. The plastic may be a polyethylene, cross linked polyethylene, polyamide, PVDF or another high performance plastic material as previously described and designed to withstand the operating parameters of the pipeline into which it will be deployed and also provide an abrasive resistant layer to protect the liner during the installation procedure. This may not be required, for example if a pre-liner (as described below) provides the desired reduction in friction.

The thickness of the outer plastic coating will typically be in the 2 to 5 mm range dependent upon the liner diameter.

One of the issues in aiming to achieve a tight fit inside of a steel pipeline, especially one that has been in service for an extended period of time and that has experienced internal corrosion, is that an element of tolerance for fit must be allowed for. It may be for instance, that for a new 200 mm pipe, the dimensions of the pipe are 220 mm outside diameter with a wall thickness of 10 mm such that the internal diameter is 200 mm. In the event that there has been a loss of some parts of the wall due to erosion or corrosion, then it may be that the pipe internal diameter may vary from 200 mm in parts which have been unaffected, to 210 mm where up to 50% of the wall thickness has been corroded. This is representative of a 5% variation.

This enables the liner to accommodate any manufacturing tolerances in the steel pipeline, any defect tolerances caused by erosion or corrosion, or even changes in diameters due to different grades of steel pipe having been used for the construction of various parts of the pipeline structure. An intimate contact with the wall of the host steel pipe is especially desirable when operating at high pressures as this will ensure a satisfactory transfer of load and stress through the liner to the steel pipe wall, with the liner and steel pipe thus acting as a composite structure. If for instance the stand alone burst pressure of a liner is 100 bar, and it is used inside a defective pipe having a burst pressure which is considerably reduced from its original design pressure due to wall thinning resultant from erosion or corrosion, the composite effect of the liner and the steel pipe may, in all but the most seriously defective cases, effectively restore the pipeline to its original design pressure rating.

This is relevant in the case where the operating or design pressure of the pipeline is rated at a higher level than the burst pressure of the liner, so in the case where, for instance, the operating pressure of the pipeline is ordinarily less than 100 bar, the operating pressure of the pipeline would be completely restored by the introduction of the liner even in the event where the steel wall of the pipeline had completely deteriorated to a point of total failure.

In order to size the liner so as to produce a tight fit, it must be manufactured to a custom diameter.

The liner, although manufactured in a circular profile and sized so as to provide a perfectly tight fit inside of the pipeline into which it will be deployed, is reeled onto a large diameter coiling drum in a flattened profile so as enable the maximum amount of liner to be coiled in one continuous, uninterrupted manufacturing and coiling process.

Figure 2:
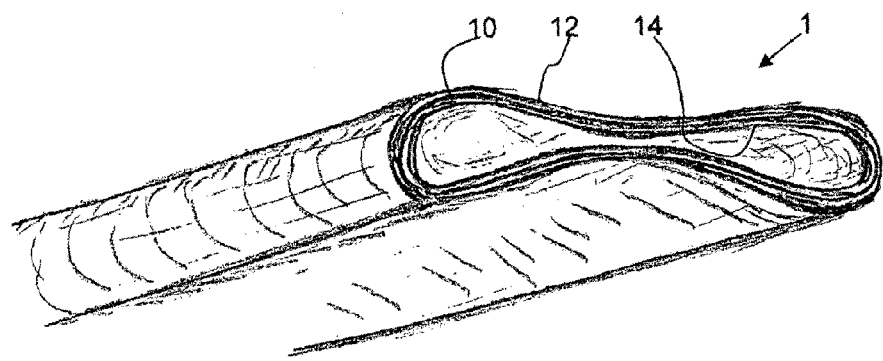
FIG. 2 is an isometric view of a liner according to one embodiment of the present invention.

FIG. 2 shows the flattened liner 1, suitable for rolling on a drum. This shows the fibre core 10, and inner and outer plastic layers 12,14. The liner 1 may have a length of 1 km to 10 km.

This process can be applicable for any diameter of liner from 10 cm up to 50 cm. The coiling drum can be equipped with an integral motor and drive mechanism which enables the forward and reverse spooling and unspooling of the liner onto and off of the storage drum.

The dimensions of the drum, when loaded with the length of liner may be suitable for transportation by road and sea within a conventional shipping container, or may be suitable for transportation by some other form such as out-of-gauge freight or deck cargo. In any event the liner will be delivered to the geographical vicinity of the metallic sub-sea pipeline to be lined, generally at an onshore location, where the other elements of materials and equipment as required for the installation of the liner at the offshore location will be accumulated in readiness for the implementation of the lining project.

The liner has a perfectly circular profile when it is manufactured, but it is squeezed together between a series of steel rollers when still warm from the plastic extrusion process so as to form the flattened profile shown as it is coiled onto the storage and shipping drum. The small wall thickness makes this possible without subjecting the liner structure to undue stresses.

Figure 3:
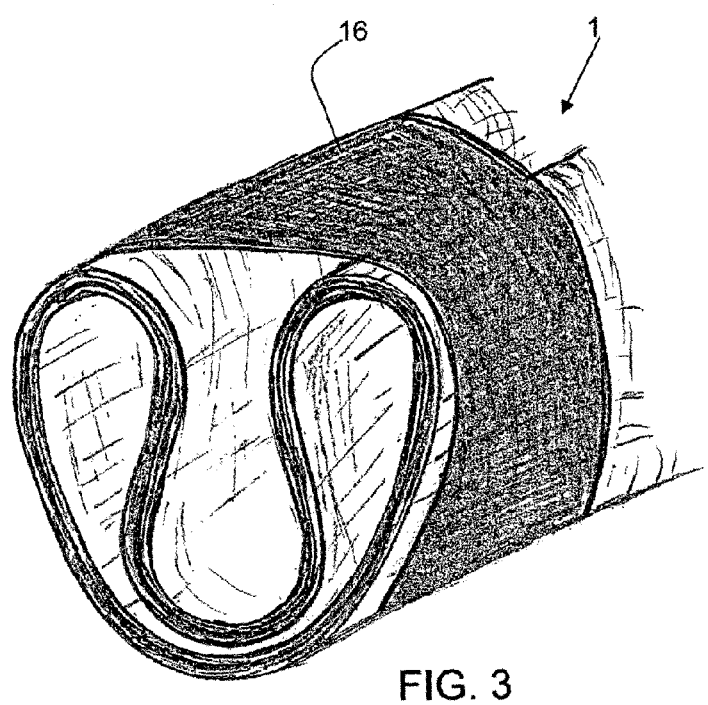
FIG. 3 is an isometric view of a liner according to one embodiment of the present invention.
Figure 4:
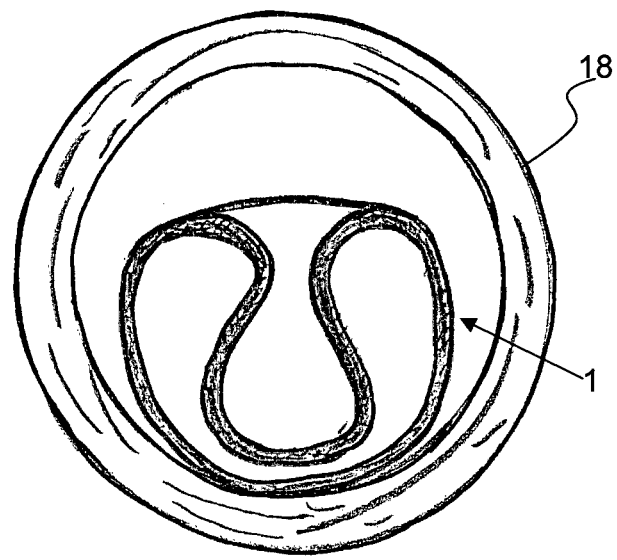
FIGS. 4 to 7 are cross-sectional views of the liner installation according to a further embodiment of the present invention.

Before installation into the pipeline, the liner is folded to a C or U shape, as shown in FIG. 3. Ties 16 are used spaced along the liner to hold the liner in the folded shape, which fits into the pipeline as shown in FIG. 4, where the pipeline is shown as 18.

Figure 5:
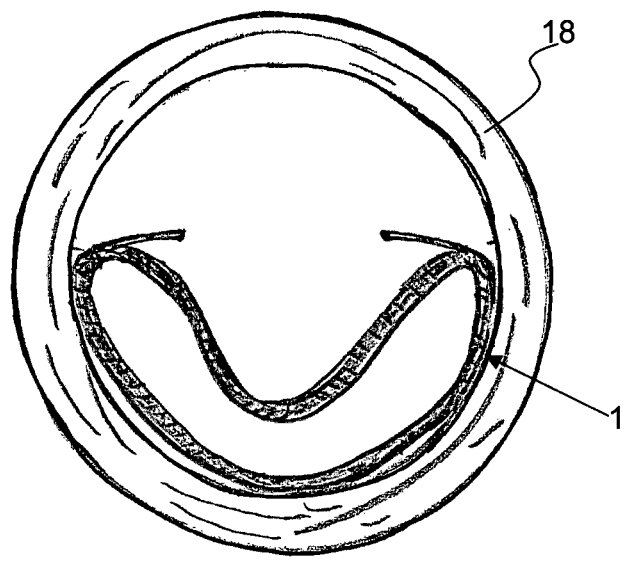

The ties break when the liner is pressurised as shown in FIG. 5

Figure 6:
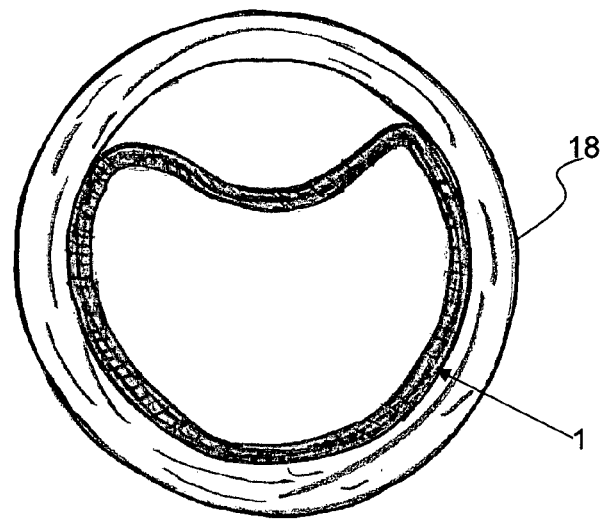
Figure 7:
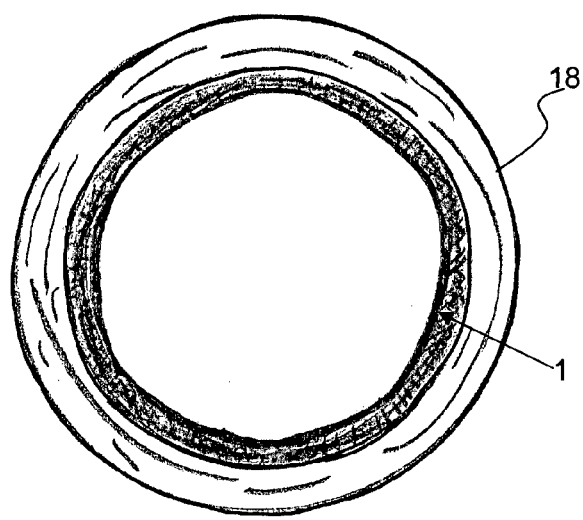
Figure 8:
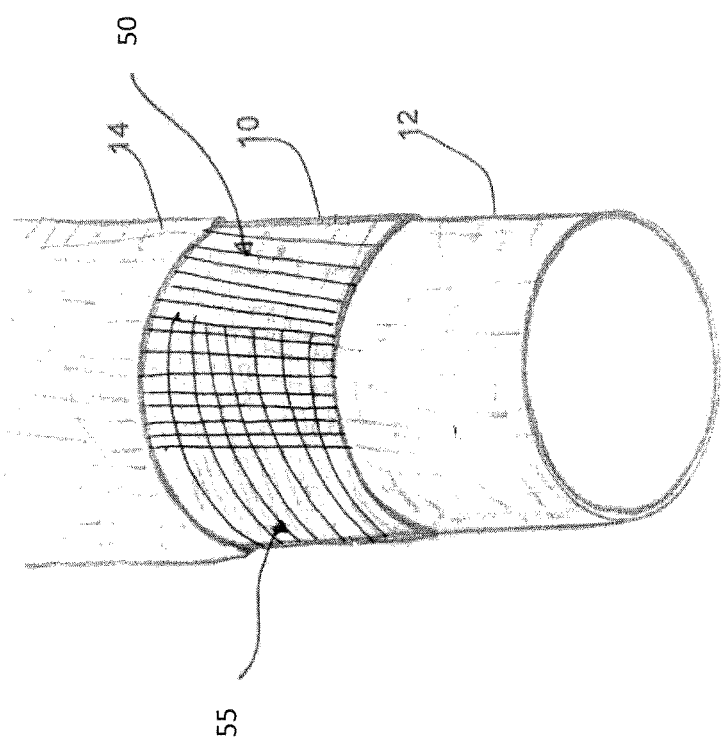
FIG. 8 is an isometric view of the liner according to a further embodiment of the present invention.

The liner is then inflated fully as shown in FIGS. 6 and 7. FIG. 8 shows the three elements of the liner 10,12,14 more clearly. The folding operation can be carried out with an electro mechanical rather than hydraulic device as the required forces are low.

The folding can take place at an onshore location, by passing the liner, which is on one reel in a flattened state after shipment from the factory to its destination country, through a folding mechanism and onto another reel where it would be stored in its folded form ready for transport offshore for installation into the pipeline.

Alternatively, the liner may be transported offshore on the shipping reel, in its flattened but unfolded state and then folded as it is spooled off from the shipping reel prior to insertion into the pipeline.

The subsea pipeline, which can convey water, gas, hydrocarbons, or a combination of some or all of these and which is to be lined with the system will generally be of a bare, unlined carbon steel type and will have been surveyed, de-commissioned, cleaned and inspected using a range of industry standard techniques and thereby made ready for the liner insertion process of the invention.

In one form, the system of the invention may be installed into a new laid pipeline as a means of providing a long term corrosion barrier and in another form, may be installed as a means of rehabilitating an existing pipeline which has been in operation for some time (in some cases months, in other cases years) that has been determined to be suffering from deterioration due to internal corrosion or erosion. The corrosion exhibited within the pipeline might be described as general wall thinning or might be described as severe pitting, or even bursts due to microbiological attack such as would be evident from Sulfate Reducing Bacteria (SRB) which are commonly prevalent in certain hydrocarbon reservoirs.

The sub-sea pipeline may run from an onshore to an offshore location, or vice versa, or may run between two offshore structures or platforms and may be in any water depth, from very shallow, to very deep locations. Where there are short radius bends, positioned in the metallic pipeline, these will have become evident from either, the as—built drawing packs or from the sight survey and inspection procedures.

Commonly, these bends would comprise short radius bends at the bottom of a riser pipe, which connects the pipeline from the sea-bed to the structure top-side. This bend is sometimes referred to as the J-tube and might have a 5D or 3D bend (i.e. having a radius equal to 5 or 3 times the pipe diameter).

It may be that there are other, additional short radius bends of similar radii, or on occasion of a greater or lesser radius positioned near to the platform on the sea bed, which serve the purpose of aligning the pipeline orientation so that it is then possible for the pipeline to proceed in a reasonably straight direction, to its ultimate destination.

The liner system needs to be able to navigate these bends. The conventional problems associated with trying to pull liners around short radius bends are:

1. Friction

Friction between the liner and the host pipe wall increases dramatically when the liner encounters a bend. In the case of a 90 degree 5D bend as will be typical at the bottom of a riser pipe situated on an offshore platform, the friction may be great enough so as to require a pulling load so significant that it would exceed the yield strength of an unreinforced plastic liner. Certainly the likelihood of this occurring increases dramatically as the number of 5D bends within the body of the pipe to be lined increases. Any conventional unreinforced liner is generally incapable of being installed around two 5D bends.

2 Liner Flexibility and Buckling

Due to the relatively stiff nature of the wall of a conventional solid walled plastic liner, such liners can only be bent around a certain minimum radius before the phenomenon known as buckling occurs. This is when the material in the pipe wall creases and folds because the bending stresses have exceeded the flexural ability of the pipe wall mass. Most liner manufacturers do not condone the use of a plastic liner product within a radius less than 20D.

The use of the fabric core means that the plastic layers can be designed to have a thickness only necessary for the provision of the required overall liner properties of permeation resistance, corrosion resistance, temperature resistance and other performance related issues, but not associated with tensile strength. Plastic layers can thus be used which are thin enough to exhibit the flexibility required to negotiate and inflate against a short radius bend without buckle.

The liner installation process makes use of winching equipment, towing cable reels, the reel of liner material and various other specialist equipment at one or the other end of the metallic pipeline. How this equipment is configured will depend upon a number of factors such as the pipeline location and route (on shore to offshore, platform to platform), available space on any offshore structure etc.

In some cases it may be possible to position the reel of liner material at the onshore location and the winching equipment at the offshore end of the pipeline. In other cases this arrangement may be reversed. If the pipeline runs between two offshore structures then it is necessary to position the reel of liner material at one offshore structure and the winch equipment and cable drum at the other. In certain cases it may be necessary to utilize the services of additional marine vessels, flat top barges or even jack up barges, so as to provide a stable working platform from which to operate at either end of the pipeline. The exact configuration may vary from one installation process to another. It may also be necessary to guide and support either the liner or towing cable (or both) over some distance from a separate storage or work platform, either into, or out of the metallic host pipe by utilizing specialist bridging or stropping devices which have been developed especially for the purpose.

The material and breaking strain rating of the cable to be used for the towing-in of the liner will be selected dependent upon the length, diameter and configuration of the metallic pipeline to be lined. In the case of relatively straight, short pipelines of say, one kilometer or less, then the cable used may be of a steel type, either jacketed with a layer of plastic or bare. In the case of longer, more complex pipelines which include bends, then the cable selected may be of a fibrous or composite nature, such as Aramid, carbon fibre or even Plasma Polyethylene, of the type that provides an extremely high strength to diameter and weight ratio. The towing load requirement can be computed exactly utilizing a towing load predictive software package. The towing cable is pulled from the winch cable storage drum back through the host pipeline by connecting the draw cable described earlier to a suitably rated winch at one end and via a shackle and connector, to the end of the towing cable at the other. The draw cable is then winched through the host pipeline drawing the main towing cable from its storage drum and through the pipeline in the process.

A conical towing head with a high integrity, high load bearing connection is installed onto the leading end of the folded coil of liner. The towing head further ensures that the entire towing load associated with the installation process is transferred to the fibrous core of the liner in a manner by which the plastic elements of the liner tube are therefore not unduly stressed during the liner installation procedure.

Figure 9:
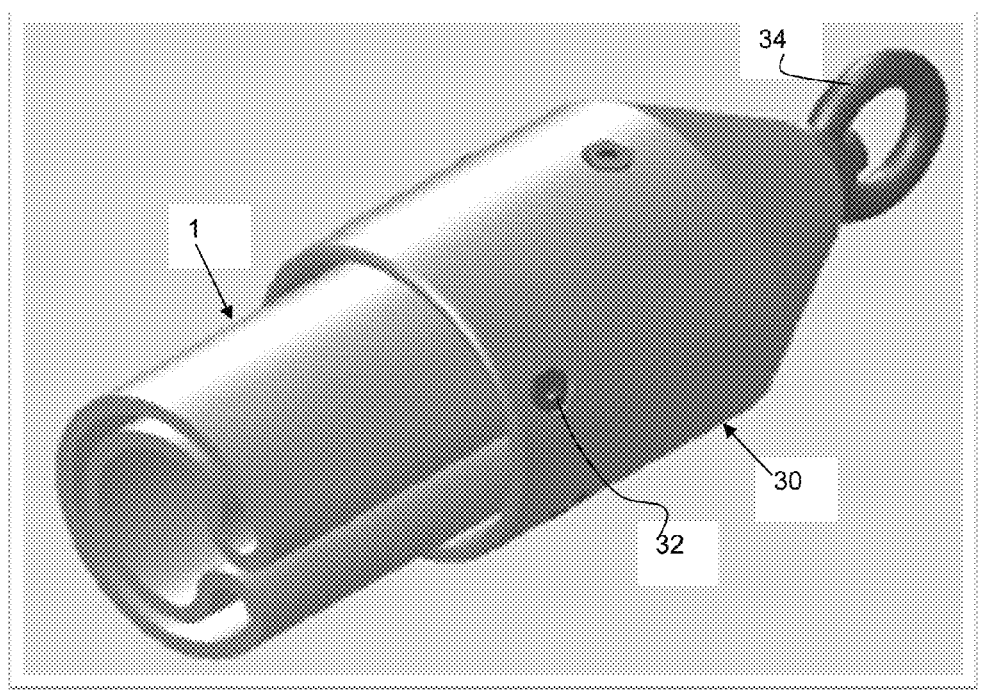
FIG. 9 is an isometric view of a towing head according to one embodiment of the present invention.

FIG. 9 shows one such embodiment of the towing head 30 with the folded liner 1 inserted. The towing head 30 has a central core around which the folded liner is wrapped, in a C-configuration, and bolts 32 pass through all three layers of the liner to engage with the central core and provide a firm grip of the liner including engagement with the middle fibre core layer.

The conical head allows the head to glide along the pipe without being caught at obstacles.

The main towing cable that has been pulled through the host pipeline is connected to the liner towing head by way of a connecting shackle and swivel arrangement 34. The towing cable at the reception end of the host pipeline is configured through and around the main winch capstan head and spooled back onto the cable storage drum.

The capstan winch head may be braced back against the end of the host pipeline in such a manner that an equal reactive force to that of the cable pulling load is transferred back into the host pipeline and will be capable of exerting a continuous steady pulling force at a regulated and constant speed, which may however be varied as required by the operator.

The cable spooling drum can be equipped with a drive and gear mechanism capable of spooling and layering the cable onto the storage drum at a constant speed, regardless of the combined diameter of the storage drum and layers of cable. At the launch end of the host pipeline, the folded liner is spooled off from the storage drum and into the host pipe. The spooling of the liner pipe into the host pipe is conducted at a constant speed regardless of the remaining diameter of the spooling drum. The end of the host pipe is fitted with a cylindrical collar which can include rollers or bearings so as to reduce the friction between the liner and the host pipe end during the insertion procedure. The liner spool, or storage drum is powered by a geared motor that is capable of delivering the liner from the spool at a constant rate which will match the rate at which the winch at the reception end is taking up the towing cable.

Further, the drive mechanism on the liner storage drum is capable of being reversed so as to effect the backing up or, if necessary, the complete removal of the liner from the host pipeline.

Once commenced however, the preferred method is to continue the liner installation procedure in one continuous smooth operation until the liner is in position throughout the entire length of the host pipeline, with several extra meters of liner material exposed at either end of the pipeline. As the liner enters the host pipeline a liberal quantity of an inert vegetable oil based lubricant may be applied to the external surface of the folded liner using a lubrication application device.

After the successful insertion of the liner throughout the entire pipeline length, the ends of the excess liner material at either end of the pipeline are then crimped, so as to form air tight seals and an—injection port installed through the excess liner at one end of the pipeline. Water or air is then pumped into the liner from a portable pump or air compressor at between 0.5 bar and 1.5 bar until it can be reported that the liner which is visible at both ends of the host pipeline has reverted to form a tight liner against the inner wall of the host pipeline. Once this has been achieved the liner can be cut to the appropriate length and high pressure end terminations can be installed so as to facilitate the hydro-test of the lined sub-sea section and the reconnection of pipe work leading into and out of the lined section of metallic pipeline.

Figure 10:
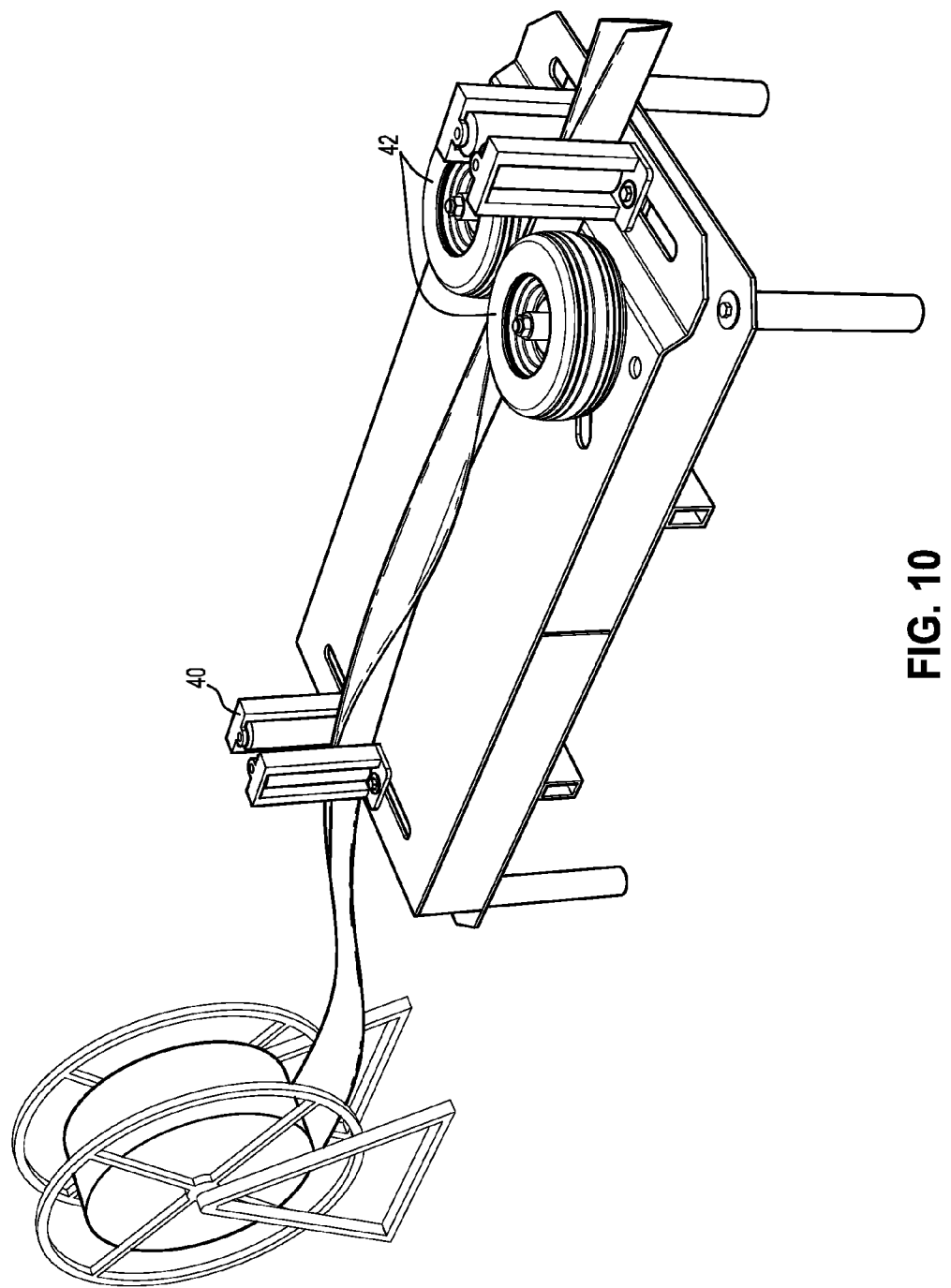
FIG. 10 is a photograph of a liner folding machine according to a further embodiment of the present invention.

FIG. 10 shows a prototype machine used to provide the folding of the liner before it is inserted. A first pair of rollers 40 provide an initial fold, and a second pair of rollers 42 with a narrower spacing provide a final fold before taping. This narrower spacing corresponds to the desired folded width. The pairs of rollers are spaced by 1 m to 5 m so that the initial fold is maintained. The first pair of rollers are passive, whereas the second pair are driven, and thereby also assist in the unspooling of the liner from the storage drum (shown partially at the back of FIG. 10). The second pair of rollers have a high friction surface, such as rubber, to enable a pulling force to be transferred to the liner.

It will be clear from the description above that the invention provides a liner with the flexibility necessary such that it can be pulled around one or more tight radius bends of equal to or less than 20 times the pipeline external diameter. The liner system results in an effective, long term corrosion and erosion barrier that fits tightly against the wall of the host pipeline into which it is being inserted. When installed as a tight fit liner inside of a deteriorated and weakened host steel pipeline, the liner has the capability of providing a composite action within and forming part of the host steel pipeline such that the burst pressure of the combined liner and steel pipeline structure may have a value that is equal to or greater than that of the original steel pipeline when new. When utilized in a steel pipeline which has effective operating pressures less than that of the burst pressure of the liner system, the liner can be considered as providing the pipeline with an effective form of "duel containment" in the event that, for whatever reason the host steel pipeline should suffer from deterioration due to external damage or corrosion.

Various modifications will be apparent to those skilled in the art.

The invention claimed is:

1. A system for relining an undersea pipeline, said pipeline having an inlet and outlet beneath sea level, comprising
a coiling drum positioned above sea level and having a length of liner reeled thereon;
said coiling drum arranged to deliver said liner to the inlet;
an actuator engaged with a leading end of said liner and arranged to apply a tensile force to said liner so as to draw said liner through the pipeline;
wherein the liner is of a composite construction having a fibre core and a layer of plastic comprising a thermoplastic polymer on a surface of the fibre core; and
wherein said fibre core has a tensile strength in the axial direction which is greater than the tensile strength in the radial direction and is greater than the tensile strength of the layer of thermoplastic polymer, and wherein the fibre core has greater elasticity in the radial direction than in the axial direction.

2. The system according to claim 1, further including a direction assembly for re-directing the liner from the coiling drum to the inlet.

3. The system according to claim 1, further including a direction assembly for re-directing the liner from the outlet to the actuator.

4. The system according to claim 1, further including a towing head mounted to the leading end of said liner for engaging with the actuator.

5. The system according to claim 4, wherein the towing head is mounted to the fibre core.

6. The system according to claim 1, wherein the actuator positioned above sea level.

7. The system according to claim 1, wherein the liner includes at least one inner layer of plastic and at least one outer layer of plastic, said fibre core intermediate the at least one inner and outer layers.

8. The system according to claim 7, wherein the inner plastic layer is configured to provide resistance to the fluid to be carried by the pipeline and act as corrosion barrier thereby preventing the pipeline fluid from causing damage or deterioration to the pipeline.

9. The system according to claim 8, wherein the outer plastic layer is a thermoplastic polymer configured to provide abrasion resistance layer to protect the liner during the installation procedure.

10. The system according to claim 9, wherein the thermoplastic polymer of the inner and outer layers is separately selected from the group consisting of PVDF, thermoplastic polyurethane, polyethylene, cross linked polyethylene and polyamide.

11. The system according to claim 10, wherein thickness of each of the inner and outer plastic liners is from 2 to 5 mm.

12. The system according to claim 1, further including a floating platform, said coiling drum located on said floating platform.

13. The system according to claim 1, wherein the fibre core comprises fibre reinforcements comprising warp fibres which run generally axially along the length of the liner.

14. The system according to claim 1, wherein the fibre core comprises weft fibres which run circumferentially around the liner.

15. The system according to claim 1, wherein with the liner in a flattened orientation whilst reeled on the coiling drum.

16. The system according to claim 1, wherein the coiling drum has a capacity to contain lengths of the liner in the range 1 km to 10 km.

17. A method for relining an undersea pipeline, the method comprising the steps of:
positioning a coiling drum above sea level, having a length of liner reeled thereon; delivering said liner to a subsea inlet of the pipeline;
engaging an actuator with a leading end of said liner;
applying a tensile force to said liner so as to draw said liner through the pipeline; wherein the liner is of a composite construction having a fibre core and a layer of thermoplastic polymer on a surface of the fibre core, and wherein said fibre core has a tensile strength in the axial direction which is greater than the tensile strength in the radial direction and is greater than the tensile strength of the layer of plastic, and wherein the fiber core has greater elasticity in the radial direction than in the axial direction.

18. The method according to claim 17, wherein the thermoplastic polymer is selected from the group consisting of PVDF, thermoplastic polyurethane, polyethylene, cross linked polyethylene and polyamide.

19. The method according to claim 17, wherein the liner includes at least one inner layer of plastic and at least one outer layer of plastic, said fibre core intermediate the at least one inner and outer layers.

* * * * *